United States Patent [19]

Niles

[11] Patent Number: 4,956,665
[45] Date of Patent: Sep. 11, 1990

[54] FRAMING APPARATUS FOR A MEDICAL SCANNING CAMERA

[75] Inventor: Thomas J. Niles, Tewksbury, Mass.

[73] Assignee: Polaroid Corporation, Cambridge, Mass.

[21] Appl. No.: 375,191

[22] Filed: Jul. 3, 1989

[51] Int. Cl.$^5$ .................. G03B 27/48; G03B 27/50
[52] U.S. Cl. ................................. 355/50; 354/76; 355/1; 355/21
[58] Field of Search ............... 355/1, 21, 39, 44, 50; 354/76, 79, 80, 292, 295

[56] References Cited

U.S. PATENT DOCUMENTS

| | | |
|---|---|---|
| 3,415,644 | 12/1968 | Land . |
| 3,594,164 | 7/1971 | Rogers . |
| 3,753,392 | 8/1973 | Land . |
| 4,353,640 | 10/1982 | Wyller ................................. 355/21 |
| 4,676,617 | 6/1987 | Buirley et al. ...................... 354/76 |
| 4,701,039 | 10/1987 | Johnson ........................... 355/21 X |
| 4,757,334 | 7/1988 | Volent ................................ 354/76 |
| 4,839,675 | 6/1989 | Owen .................................. 354/76 |
| 4,872,030 | 10/1989 | Kochmann et al. ................ 354/76 |

OTHER PUBLICATIONS

U.S. patent application Ser. No. 202,480, filed Jun. 6, 1988, W. Hudspeth.

Primary Examiner—Richard A. Wintercorn
Attorney, Agent, or Firm—John J. Kelleher

[57] ABSTRACT

Hand held compact apparatus, e.g. a camera, for photographically copying a portion of an illuminated image includes a member that enables a camera operator to accurately frame and/or preview a portion of the image prior to its exposure, a portion that becomes blocked from view when the camera is placed in its exposure position. In operation a camera operator places the framing and/or previewing member in direct contact with a selected portion of a backlighted film transparency, prior to its exposure. When framing and/or previewing is complete, the operator rotates the pivotally attached camera into its image copying or exposure position. An opening through the framing and/or previewing member and an opening in the camera housing through which the image must pass for image copying purposes become mechanically aligned with one another when the camera is rotated into its exposure position, thereby enabling an accurately framed photograph of the selected transparency portion to result.

8 Claims, 4 Drawing Sheets

FRAMING APPARATUS FOR A MEDICAL SCANNING CAMERA

BACKGROUND OF THE INVENTION

1. Field of the Invention

The present invention relates to hand-held apparatus for photographically copying a portion of an illuminated image, in general, and to such apparatus for copying a portion of a back-lighted photographic film transparency, in particular.

2. Description of the Prior Art

At the present time there is a fairly large need for relatively simple, portable and compact apparatus, such as a camera, that is capable of expeditiously making a photograph or hard copy of all or a selected portion of an illuminated transparent image. In the medical field, for example, it is fairly normal practice to make a multiple image set of x-rays or film transparencies of selected views of a patient's anatomy in order to provide a treating (or consulting) physician with an additional tool for diagnosing the patient's illness. Standard practice in such instances is to provide a single copy of each anatomical view produced by x-ray, or other imaging means, for inclusion in the patient's case file.

Typically, a treating physician views 14×17 inch transparencies wherein each transparency includes a single x-ray image or multiple smaller images produced either by Computed Tomography (CT) or Magnetic Resonance Imaging (MRI). In many (if not all) instances, the treating physician would like to have a copy of one or two individual images or portions thereof per patient case that best establishes the diagnosis of pathology (or normalcy) for his own records and for the records of a consulting physician. It is only in rare instances where a physician needs a complete imagery set for his own records. To obtain such individual images today is an unwieldy, time consuming and expensive process, even at a very large medical facility, and is therefore rarely used.

There is a major disadvantage associated with a physician's inability to promptly obtain a copy of selected portions of his or her patient's diagnostic images. These images theoretically belong to the patient, and in a medical facility access to them is generally controlled by the radiology department. With very large numbers of diagnostic image sets to take care of, it is not uncommon for the radiology department in such a facility to lose or temporarily misplace a substantial number of the diagnostic images placed in its care. Therefore, if a physician is not able to obtain a copy of the pertinent images during the relatively short period of time that he has personal contact with the entire case file, i.e., while he is diagnosing or formally consulting, it is highly unlikely that he will have easy access to these images at some time in the future. The lack of easy and repeated access to a patient's diagnostic images is a fairly common problem in the medical field.

A compact, hand-held camera for photographing an illuminated image, such as that formed by x-rays on a film transparency, is described in commonly assigned, copending U.S. patent application Ser. No. 202,480, filed Jun. 6, 1988 by W. Hudspeth. This particular camera owes its compactness, in large part, to the use of an optical path shortening microlens array that couples the selected film transparency portion to be photographed, to the camera's film plane. The camera functions, in part, by placing an opening in the camera's housing, through which a photographic image is formed, directly over that portion of the total illuminated image selected to be photographed and in direct contact with the film transparency. A disadvantage inherent in this camera is that it blocks an operator's view of the image portion to be photographed when placed in its exposure position. Blocking the selected image portions from the camera operator's view makes it difficult to accurately frame this image portion so that the most advantageous photographic image thereof can be produced.

SUMMARY OF THE INVENTION

It is a primary object of the present invention, therefore, to provide a compact, hand-held camera for copying a selected portion of an illuminated image that can produce an accurately framed photograph of a selected portion of the illuminated image.

It is another object of the present invention to provide a compact, hand-held camera for copying a selected portion of an illuminated image that can frame the selected image portion without blocking it from the view of a camera operator.

It is a further object of the present invention to provide a compact, hand-held camera with means for framing and viewing a selected portion of an illuminated image that does not significantly increase external camera dimensions.

Other objects, features and/or advantages of the present invention will be readily apparent from the following detailed description of a preferred embodiment thereof when taken in conjunction with the accompanying drawings.

In accordance with the present invention compact, hand-held apparatus for photographically copying a portion of an illuminated image is provided with means for precisely selecting said illuminated image portion. The image selecting means includes a framing member that is pivotally attached to said copying apparatus and is manually movable between a framing position where an apparatus operator has an unobstructed view of the image portion to be copied through a framing member opening and a position where the framing member opening is in registration with an opening in the copying apparatus through which image-carrying light rays must pass for image copying purposes. An operator positions the framing member to its framing position and then places it directly over the selected image portion. When framing is complete, the operator moves the attached photographic apparatus to its exposure position and then initiates an image copying cycle to thereby produce a precisely framed copy of said selected image portion.

DESCRIPTION OF THE PREFERRED EMBODIMENT

Figure 1A:
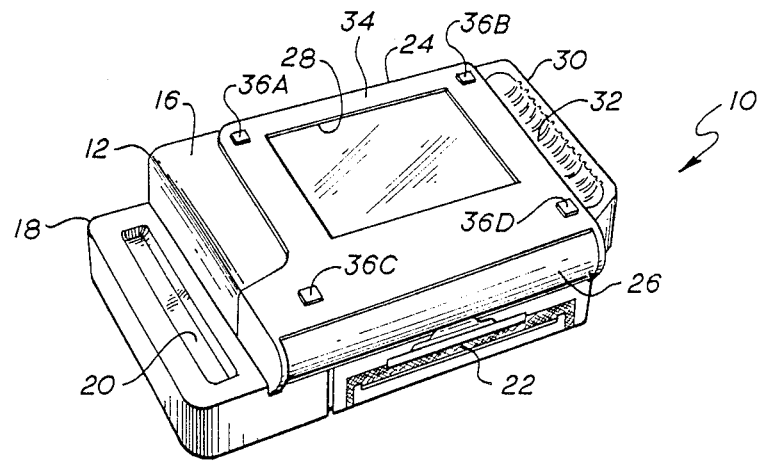
FIG. 1A is a perspective view of the illuminated image copying apparatus of the present invention with its frame member shown in its folded or exposure position.
Figure 1B:
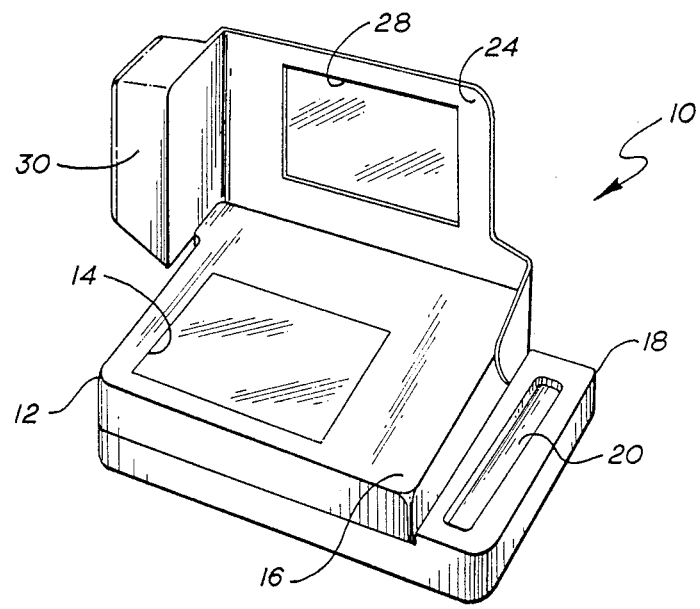
FIG. 1B is a perspective view of the illuminated image copying apparatus of the present invention with its frame member shown in its upright or image framing position.

With reference to FIGS. 1A and 1B of the drawings, numeral 10 generally indicates portable and highly compact apparatus, employing a preferred embodiment of the present invention, for photographically copying a selected portion of an illuminated image. As shown in FIGS. 1A and 1B, the apparatus 10 includes a housing 12 having a generally rectangular opening 14 formed in an upper wall 16 thereof that provides the only external opening through which light from an illuminated image may pass for image copying purposes.

The housing 12 includes a hand grip 18 projecting from a side thereof having a recess 20 thereon for accepting the tips of an operator's right fingers in preparation for and during camera operation. The housing 12 also includes a light-sealed slot 22 through which a later to be described exposed film unit is advanced into ambient light after an illuminated image present at the housing opening 14 has been transferred to the film unit by the apparatus 10.

The apparatus 10 is provided with a generally planar frame member 24 that is pivotally attached near an end 26 of the housing 12. The frame member 24 is manually pivotable between a folded or exposure position, as shown in FIG. 1A where an opening 28 in the frame member 24 overlies the opening 14 in the housing 12, in registration therewith, and an upright or framing position as shown in FIG. 1B where the frame member 24 is approximately at right angles with respect to the housing opening 14. The frame member 24 includes a hand grip 30 projecting from a side thereof having a recess 32 therein for accepting the tips of an operator's left fingers in preparation for and during camera operation. An outer surface 34 of the frame member 24 is provided with four pad members 36A, 36B, 36C and 36D, adhesively attached thereto, whose outer surfaces establish a plane for locating an illuminated transparent image at the frame member opening 28.

Figure 2:
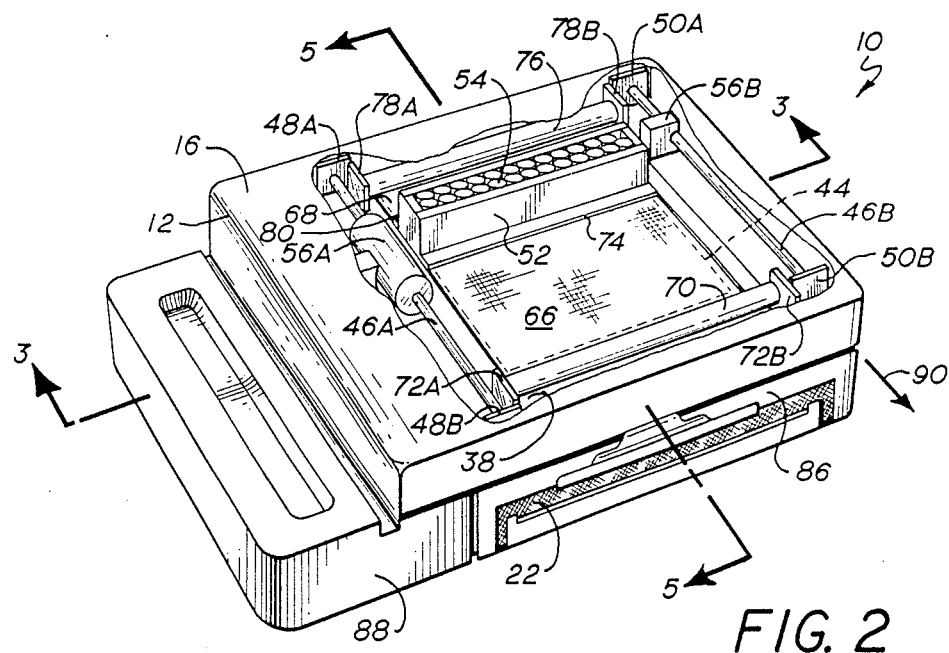
FIG. 2 is the same as FIG. 1A except that the frame member has been removed and portions of an upper housing wall have been broken away to facilitate describing internal copying apparatus portions.
Figure 3:
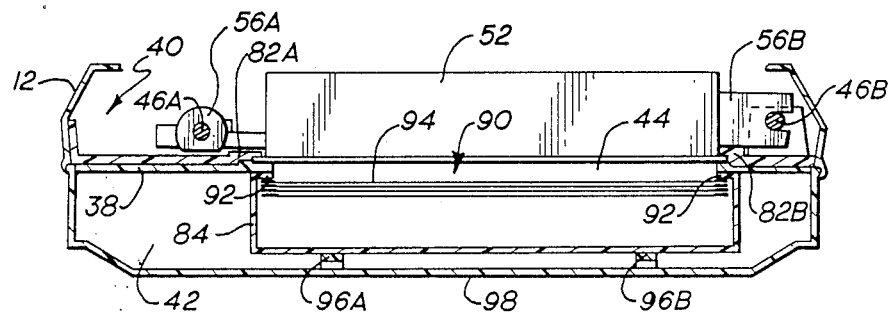
FIG. 3 is a sectional view taken on the line 3—3 in drawing FIG. 2.

Reference should now be made to FIG. 2 which is the same as that shown in FIG. 1A except that frame member 24 has been removed and upper wall 16 has been broken away to facilitate the description of internal portions of the compact copying apparatus 10. Reference should also be made to FIG. 3 which is a partial sectional view taken on the line 3—3 in drawing FIG. 2. As shown in FIGS. 2 and 3, the copying apparatus 10 includes an intermediate wall 38 that is spaced from and generally parallel to the upper wall 16, a wall that divides the interior of the housing 12 into an upper chamber 40 and a lower lighttight chamber 42. Intermediate wall 38 includes a rectangular opening 44 that is approximately the same size as the opening 14 (FIG. 1B) in the upper wall 16 and is in registration therewith.

Linear guide rods 46A and 46B, of circular cross section, are mounted in a fixed position on opposite sides of the intermediate wall opening 44. Rods 46A and 46B are mounted parallel to one another and generally parallel to an adjacent side of the rectangular opening 44. Rod 46A is mounted to the wall 38 by a pair of bosses 48A and 48B, while rod 46B is mounted to the wall 38 by a similar pair of bosses 50A and 50B. A lens assembly 52 and microlens array 54 forming a portion thereof is slidably supported on the guide rods 46A and 46B by a pair of guides 56A and 56B, respectively.

The microlens array 54 is a commercially available lens strip comprised of a plurality of miniature, image-forming cylindrical lenses that are optically aligned and rigidly mounted with respect to one another. The function of the microlens array 54 is to transfer an illuminated image located at an object plane defined by the outer surfaces of the frame member pads 36A, 36B, 36C and 36D adjacent the object end of said array, to an image or focal plane in the lower lighttight chamber 42 of the housing 12 at the opposite or image end of said array, within a relatively short distance. In the copy apparatus 10 of the present invention this distance is equal to 1.503 inches. One such lens array is sold by NSG America Inc. of Somerset, N.J. under their registered trademark SELFOC.

Figure 4:
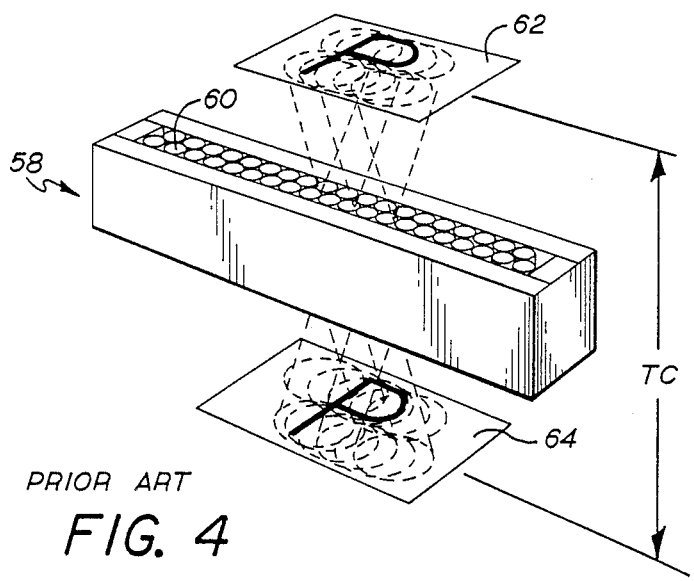
FIG. 4 is a perspective view of a commercially available microlens array of the type employed in the copying apparatus of the present invention.

The typical lens array is comprised of one or two rows of graded-index microlenses, each with equal dimensions and optical properties. Prior art FIG. 4 is a perspective view of a commercially available lens assembly 58 incorporating a microlens array 60 of the type employed in the copying apparatus 10. As shown in FIG. 4, the lens array 60 includes an object plane 62 spaced from the object end of the array 60 and an image plane 64 spaced from the image or other end of the array 60. An illuminated image of, for example, the letter P placed at the object plane 62 of the array 60 will be transferred to the image plane 64 by the lens array 60. The transferred image is erect (non-inverted in each of two mutually perpendicular directions) and the ratio between the size of the image at the object plane 62 and the size of the image at the image plane 64 is preferably one-to-one. The total conjugate TC, which is the distance between the object plane 62 and the image plane 64, is a matter of design choice and is primarily determined by the size of the copying apparatus housing in which it is to be employed. In the housing 12 of the copying apparatus 10 the TC for the microlens array 60 is chosen such that its object plane can be located substantially coincident with the plane defined by the outer surface of the frame member pads 36A, 36B, 36C and 36D and such that its image plane can be located substantially coincident with the focal plane within the copier housing 12.

As shown in FIG. 2 a pair of shades 66 and 68, each formed of a sheet of flexible opaque material, are retractably mounted on the intermediate wall 38, with each shade covering varying portions of the intermediate wall opening 44. Shade 66 has one end attached to and wrapped on a torsion-spring-biased rod (not shown) to form a roll 70 that is, in turn, rotatably mounted on the intermediate wall 38 by a pair of bosses 72A and 72B, adjacent a side of the rectangular shaped intermediate wall opening 44. The other end of the shade 66 is attached to a flange 74 laterally extending from the bottom of the lens assembly 52, in a lighttight relation.

Similarly, the shade 68 has one end attached to and wrapped on a torsion-spring-biased rod (not shown) to form a roll 76. This rod is, in turn, rotatably mounted on the intermediate wall 38 by a pair of bosses 78A and 78B, adjacent that side of the intermediate wall opening 44 directly opposite from the side of the opening that is adjacent to the roll 70. The other end of the shade 68 is attached in a lighttight relation to the flange 80 that laterally extends from the bottom of the lens assembly 52 in a direction opposite to that of the flange 74. The torsion-spring-biased rods rotatably supporting an end of either the shade 66 or 68 maintain a tension force on each of the shades and provide the force that wraps these shades onto their respective support rods to form the rolls 70 or 76 when the lens assembly 52, attached to the opposite end of each of the shades, is driven across the intermediate wall opening 44.

With continued reference to drawing FIG. 3, the sides of the shades 66 and 68 are maintained in lighttight sliding contact with those portions of the upper surface of the intermediate wall 38 adjacent the opening 44, in part, by a pair of labyrinth defining flanges 82A and 82B. In addition, the length of the flanges 82A and 82B are substantially longer than the respective lengths of the adjacent sides of the opening 44 so that those portions of the shade 66 and 68 extending beyond the opening 44 and subsequently being wrapped onto or unwrapped form their respective torsion-spring-biased support rods will also be maintained in lighttight sliding engagement with those portions of the upper surface of the intermediate wall 38 adjacent the opening 44. The relationship between the lens assembly 52, the shades 66 and 68, and the structure forming the opening 44 in the intermediate wall 38 is such that any light passing through the opening 44, including the period when the lens assembly 52 is driven across the opening 44, can only pass through the microlens array 54 in the lens assembly 52.

The copying apparatus 10 incorporates a recess therein for accepting a multiple film unit cassette 84 as shown in drawing FIG. 3. Access to this recess is gained by pivoting a panel 86, forming a portion of a sidewall 88 of the housing 12, in a direction 90 as shown in drawing FIG. 2. The cassette 84 incorporates a stack of film units 90 which are spring biased toward an upper wall 92 thereof by spring means (not shown) so as to located an uppermost film unit 94 in the focal plane within the housing 12 or in an exposure position adjacent the opening 44 in the intermediate wall 38. The film units 90 are of the integral, self-developing type with each unit including a rupturable pod of processing liquid at their leading end and a trap at their trailing end for receiving any excess processing liquid, as is well known in the art. The cassette 84 may also enclose a 6 VDC battery (not shown) for supplying electrical power to the various electrical systems and subsystems within the copying apparatus 10. The copying apparatus 10 includes a pair of rails 96A and 96B on an interior surface of a bottom wall 98 of the housing 12 for supporting the film cassette 84 in position for the sequential exposure of the film units 90. For a more detailed description of integral film units of the type employed herein reference may be had to U.S. Pat. No. 3,415,644 issued to E. H. Land on Dec. 10, 1968 and U.S. Pat. No. 3,594,164 issued to H. G. Rogers on Jul. 20, 1971.

Figure 5:
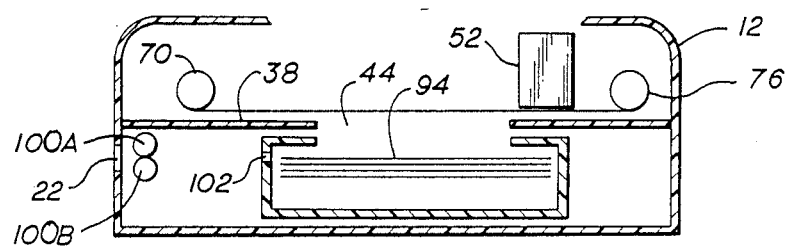
FIG. 5 is a sectional view taken on the line 5—5 in drawing FIG. 2.

With additional reference to FIG. 5 of the drawings, which is a partial sectional view taken on the line 5—5 in drawing FIG. 2, the microlens assembly 52, having a 6 VDC motor (not shown) coupled thereto, is driven by this motor across the opening 44 in intermediate wall 38 during each exposure cycle. The microlens assembly 52 is driven across the opening 44 for the purpose of transferring an illuminated image located in the above-mentioned plane defined by the outer surfaces of the pads 36A, 36B, 36C and 36D on the frame member 24, when the copying apparatus 10 is in its exposure position, to photosensitive material such as the film unit 94 within the camera housing 12 located in an exposure position adjacent the intermediate wall opening 44. The microlens assembly 52 transfers an illuminated image located at the above-defined plane to such photosensitive material in each direction of travel across the intermediate wall opening 44. When the microlens assembly 52 is in a rest position at either side of the opening 44 the intermediate wall 38 blocks or precludes the transmission of light from an illuminated image located at the above-defined plane and exiting from the microlens array 54, to the photosensitive film unit 94.

The copying apparatus 10 is also provided with conventional apparatus (not shown) for advancing an exposed film unit such as film 94 into the bite of a pair of juxtaposed processing rollers 100A and 100B for film unit processing and for transporting a processed film unit through the light-sealed slot 22 and to an apparatus 10 operator. The processing rollers 100A and 100B have a separate 6 VDC drive motor coupled thereto and to a conventional pick or film unit advancing arm (not shown) such as that described in U.S. Pat. No. 3,753,392 to Land, the disclosure of which is specifically incorporated herein by reference. As explained in much greater detail in this Land '392 patent, the film advancing pick or arm reaches into a slot (not shown) in the cassette 84, engages a trailing edge of an exposed film unit such as film unit 94 and advances the exposed film unit through an exit slot 102 in the cassette 84 and into the bite of rotating processing roller pair 100A, 100B in registration with the cassette exit slot 102. The rotating processing roller pair 100A, 100B rupture the pod of processing liquid located at the leading edge of the exposed film unit and spread the contents thereof between photosensitive and image-receiving layers while simultaneously advancing the exposed film unit through the light-sealed opening 22 in the copier housing 12. Shortly after the processing liquid has been spread a conventional limit switch (not shown) interrupts power to the processing roller drive motor and thereby terminates the rotation of the processing roller pair 100A and 100B.

OPERATION

Figure 6:
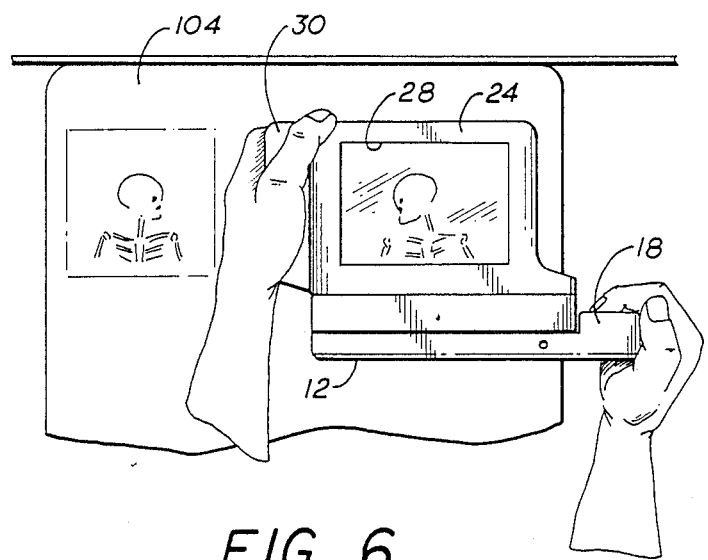
FIG. 6 is an elevational view of the copying apparatus of the present inventions shown being held in its framing position against an illuminated image by an apparatus operator.
Figure 7:
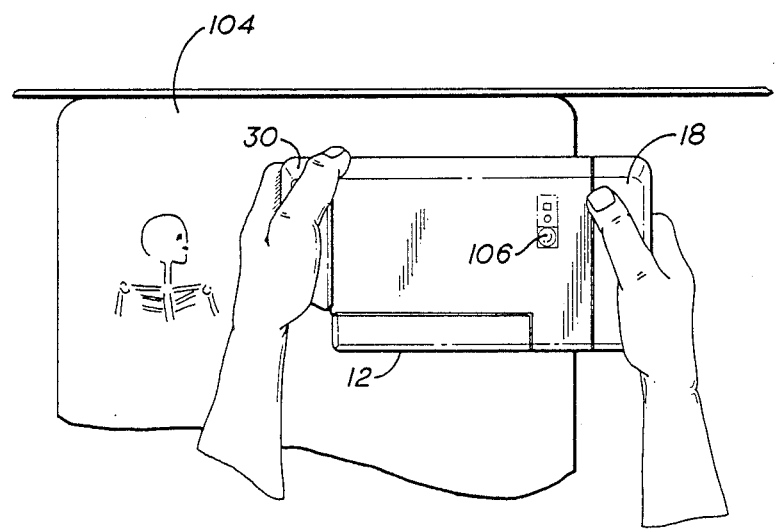
FIG. 7 is an elevational view of the copying apparatus of the present invention with the frame member being shown held in its exposure position against an illuminated image by an apparatus operator.

The sequence of operations of a typical illuminated-image transferal or copying cycle will now be described in detail. Reference is additionally made to FIGS. 6 and 7 of the drawings which are elevational views of the copying apparatus 10 shown being held by a camera operator in its framing and exposure positions, respectively. As shown in FIG. 6, the apparatus 10 operator has grasped the frame member hand grip 30 with his left hand, has grasped the housing hand grip 18 with his right hand and has rotated the frame member 24 from the position as shown in drawing FIG. 1A to the position as shown in drawing FIG. 1B. In addition, the operator has placed the opening 28 of the frame member 24 over a selected portion of a backlit transparent image 104 such that the outer surfaces of the pads 36A, 36b, 36C and 36D projecting therefrom are in direct physical contact with the adjacent surface of the image 104. When the operator is satisfied that the selected image portion is properly framed by the appropriate positioning of the frame member 24 on the transparent image 104, he rotates the apparatus housing 12 from its framing position, as shown in FIG. 6, to its exposure poisition, as shown in FIG. 7, where the housing opening 14 (FIG. 1B) is in registration with the selected from image portion. After the housing 12 has been rotated into its exposure position the operator depresses a button 106 on the housing 12 adjacent his right thumb as shown in drawing FIG. 7 to thereby initiate copying of the selected portion of illuminated image 104 by the apparatus 10.

The depression of the button 106 couples the conventional microlens assembly drive motor (not shown) to a battery (not shown) within the copying apparatus 10. This drive motor, in turn, drives the microlens assembly across the housing opening 14 and across intermediate wall opening 44 in registration therewith the thereby transfer the selected portion of illuminated image 104 located at the plane defined by the outer surfaces of the pad members 36A, 36B, 36C and 36, to the photosensitive film unit 94 located at the film plane of the copying apparatus 10. Upon completion of this image-transferring process the microlens assembly motor (not shown) is de-energized and the motor (not shown) that is coupled to the conventional film advance apparatus (not shown) and the processing rollers 100A and 100B is then automatically energized. The pick or arm (not shown) forming a part of the film advancing apparatus and being driven by this motor transports the exposed film unit 94 into the bite of the spread rollers 100A and 100B. There rotating rollers rupture the pod of processing liquid located at the leading edge of the film unit 94 and spread its contents between certain layers thereof to initiate the formation of a visible image, as previously explained. The rollers 100A and 100B subsequently move the exposed and processed film unit 94 out into ambient light through the light sealed opening 22 in the copier housing 12. A conventional limit switch interrupts power to the processing roller drive and thereby terminates the rotation of the processing roller pair 100A and 100B and the image-copying cycle.

From the foregoing description of the invention it will be apparent to those skilled in the art that various improvements and modifications can be made in it without departing from its true scope. The embodiment described herein is merely illustrative and should not be viewed as the only embodiment that might encompass the invention.

What is claimed:

1. Photograhic apparatus for precisely selecting copying a portion of an illuminated image, comprising:
    a housing having an opening therein for the passage of image-carrying light therethrough;
    means for locating photosensitive material at a plane within said housing;
    image-transferring means mounted within said housing in a lighttight relation with respect to said housing opening, said image transferring means being actuatable for transferring image-carrying light entering said housing opening to said plane;
    a frame member having an opening therein for precise placement over a selected portion of said illuminated image;
    means for coupling said frame member to said housing such that said housing may be moved between a framing position where said frame member is placed over the selected illuminated image portion and where it does not block a camera operator's view of said selected image portion, and an exposure position where the housing opening is in registration with the frame opening in preparation for photographically copying said selected illuminated image portion; and
    means for actuating said image-transferring means to thereby transfer image-carrying light entering said housing opening to said plane and to photosensitive material located thereat.

2. The apparatus of claim 1 wherein said coupling means includes means for pivotally coupling said frame member to an external surface of said apparatus housing.

3. The apparatus of claim 1 wherein said frame member includes a hand grip projecting from a side of thereof to facilitate the placement of said frame member against the illuminated image by an apparatus operator for the subsequent photographic copying of the selected illuminated image portion.

4. The apparatus of claim 3 wherein said housing includes a handgrip to facilitate the movement of said apparatus between its said framing and exposure positions by the apparatus operator.

5. The apparatus of claim 1 wherein said frame member includes means for supporting the illuminated image in a plane defined by an outer surface of a projection of said frame member.

6. The apparatus of claim 5 wherein said illuminated image supporting means comprises a plurality for projection with each projection having an outer surface and with the outer surface of each projection collectively defining said plane.

7. The apparatus of claim 1 wherein said housing opening and said frame member opening are rectangular.

8. A method of precisely framing a selected portion of an illuminated image with a photographic camera of the type having a housing that includes an opening for the passage of image-carrying light therethrough, which camera functions by placing the housing opening in an exposure position over the selected image portion where it obscures the view thereof by a camera operator during the subsequent photographic copying thereof, comprising the steps of:
    attaching a frame member to the camera housing such that it is manually movable between an exposure position where the frame member opening is in registration with the camera housing opening and a frame position out of registration with the housing opening where a camera operator has an unobstructed view of the frame member opening;
    placing the frame member over the selected image portion when the frame member is in its framing position; and
    manually moving the camera housing into the exposure position with its opening in registration with the frame member opening for the subsequent photographic copying of the selected image portion by the camera.

* * * * *